United States Patent [19]

Gee et al.

[11] 3,863,367
[45] Feb. 4, 1975

[54] AUGER SCRAPER WITH RECESSED EJECTOR

[75] Inventors: James E. Gee, Washington; Robert N. Stedman, Chillicothe, both of Ill.

[73] Assignee: Caterpillar Tractor Co., Peoria, Ill.

[22] Filed: Nov. 19, 1973

[21] Appl. No.: 416,954

[52] U.S. Cl. ................. 37/8, 37/126 AE, 198/213
[51] Int. Cl. ............................................. E02f 3/06
[58] Field of Search... 37/4, 8, 124, 126 R, 126 AE, 37/129; 214/83.32; 198/213

[56] References Cited
UNITED STATES PATENTS

| | | | |
|---|---|---|---|
| 2,353,120 | 7/1944 | Austin | 37/126 AE |
| 2,956,353 | 10/1960 | Hanner et al. | 37/126 AE X |
| 3,352,439 | 11/1967 | Hardwick | 37/126 AE |
| 3,431,659 | 3/1969 | Elger | 37/4 |
| 3,533,173 | 10/1970 | Fenske | 37/4 |
| 3,533,174 | 10/1970 | Carston | 37/8 |
| 3,675,347 | 7/1972 | Siewert et al. | 37/126 AE X |
| 3,738,028 | 6/1973 | Reinhardt | 37/4 |

Primary Examiner—Robert E. Bagwill
Assistant Examiner—E. H. Eickholt
Attorney, Agent, or Firm—Phillips, Moore, Weissenberger, Lempio & Strabala

[57] ABSTRACT

A scraper bowl has a cutting edge disposed at a forward open end thereof and a normally upright auger rotatably mounted in the bowl for elevating and distributing material therein. An ejector, movably mounted in the scraper bowl, has a recess formed therein to accommodate the auger upon forward movement thereof during the unloading phase of scraper operation.

6 Claims, 3 Drawing Figures

PATENTED FEB 4 1975
3,863,367
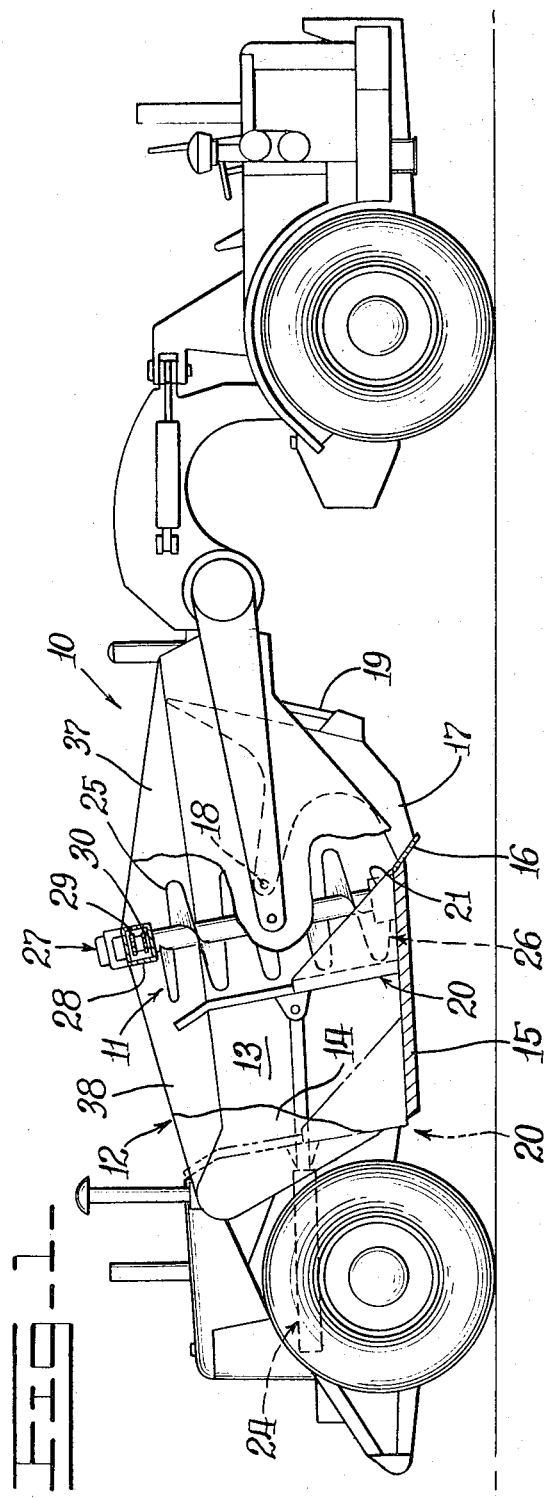
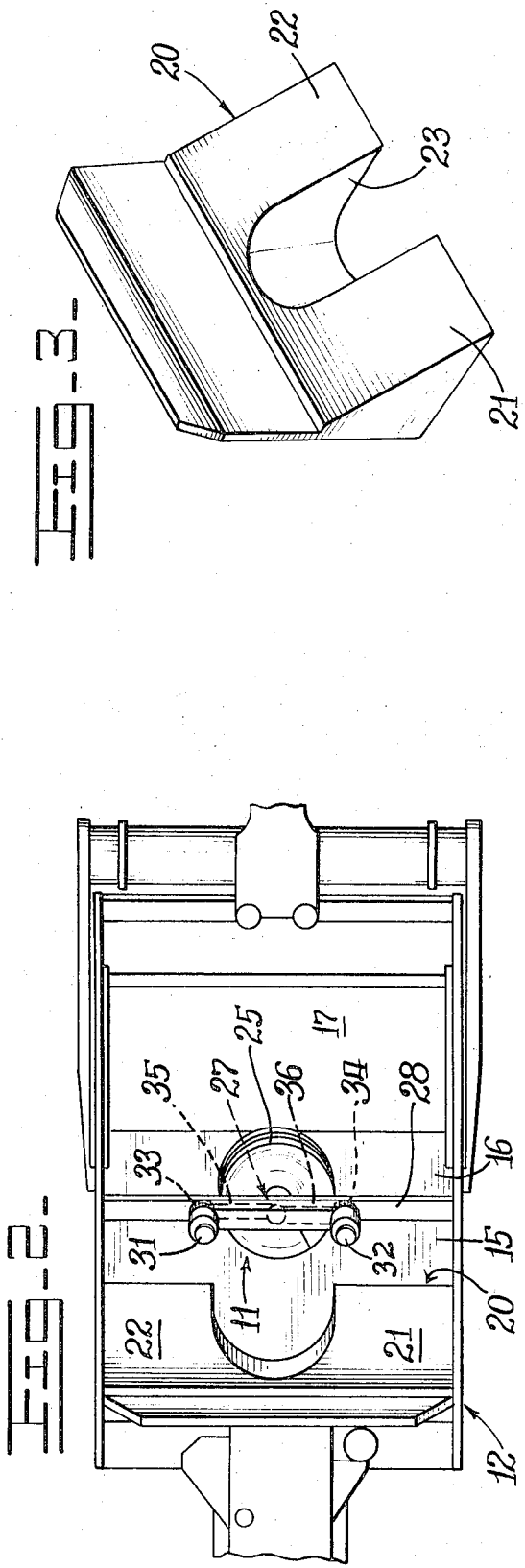

3,863,367

AUGER SCRAPER WITH RECESSED EJECTOR

BACKGROUND OF THE INVENTION

This invention relates to a self-loading scraper comprising an auger for receiving, elevating and distributing material in a bowl thereof. Although the prior art broadly discloses an ejector in combination with an auger, the forward stroke of the ejector is normally limited due to the interfering disposition of the auger in the scraper bowl. Such limited movement of the ejector during the unloading phase of scraper operation has dictated the need for costly and complex apparatus for moving the auger out of the line of travel of the ejector to insure substantial unloading of material from the bowl. Attempts to solve such unloading problem are disclosed in one or more of U.S. Pat. Nos. 415,317; 1,295,173; 3,431,659; 3,443,326; 3,533,173; 3,533,174; 3,611,594; and 3,738,028.

SUMMARY OF THE INVENTION

The self-loading auger scraper of this invention comprises a generally upright auger rotatably mounted in a scraper bowl for elevating and distributing material therein. An ejector is movably mounted in the bowl and has a recess formed therein, generally conforming to the shape of the auger, to permit the ejector to move closely adjacent to a cutting edge of the scraper bowl upon the forward stroke of the ejector during the unloading phase of scraper operation. Such construction thus permits the use of a non-movable auger while yet assuring efficient and substantial unloading of the scraper bowl in contrast to many conventional auger scrapers wherein the auger is necessarily moved out of the way of the ejector during the unloading operation. Also, the ejector-auger constructions may be added to many conventional scraper bowls without effecting substantial redesign thereof.

BRIEF DESCRIPTION OF THE DRAWINGS

Other objects of this invention will become apparent from the following description and accompanying drawings wherein:

FIG. 1 is a side elevational view of a self-loading auger scraper, including an ejector, with portions of the scraper bowl broken-away to expose internal details thereof and wherein the scraper is being towed by a tractor in its transport position of operation;

FIG. 2 is a top plan view of the scraper bowl; and

FIG. 3 is a front isometric view of the ejector.

DETAILED DESCRIPTION

Referring to FIGS. 1 and 2, a self-loading wheel tractor scraper 10 has an auger assembly 11 rotatably mounted in a scraper bowl 12 thereof. The scraper includes constructions similar to those disclosed in U.S. Patent Application Ser. No. 402,345 for "Auger Scraper," filed on Oct. 1, 1973 by the applicants herein, and assigned to the assignee of this application. The bowl comprises a pair of laterally spaced and generally vertically disposed sidewalls 13 and 14 and floor 15 extending generally horizontally between and secured to the lower edges of the sidewalls. The bowl is adapted to be raised or lowered in a conventional manner by means of one or more suitably arranged hydraulic cylinders (not shown).

A downwardly sloping cutting edge 16 extends laterally across a forward edge of the floor whereby, upon lowering of the bowl, the cutting edge will engage the ground. An apron 17, normally closing the forward open end of the bowl, is pivotally mounted by pins 18 (one shown) on the sidewalls. The apron is adapted to be opened by hydraulic cylinder means, a rod of which is shown at 19 in FIG. 1.

A generally upright ejector 20 extends between sidewalls 13 and 14 and has its continuous lower scraping edges positioned closely adjacent to floor 15. The ejector comprises a pair of laterally spaced wing portions 21 and 22 and has a recess 23 formed therein, as more clearly shown in FIGS. 2 and 3. The recess is generally cylindrically shaped to generally conform to the shape of an auger, hereinafter described.

As shown by phantom lines in FIG. 1, the ejector is normally retracted by actuating means, such as a hydraulic cylinder 24, to a rearward end of the scraper bowl during the loading and carrying phases of scraper operation. The ejector is adapted to be moved forwardly by the cylinder to its solid line unloading position to eject the load over cutting edge 16 and outwardly of the bowl.

As shown in FIG. 1, auger assembly 11 comprises a generally upright auger 25 having its lower end journalled for rotation in a bearing assembly 26 secured to floor 15. The auger's upper end is similarly journalled in a bearing assembly 27 secured to the mid-portion of a hollow cross-beam 28. The cross-beam is secured between sidewalls 13 and 14.

As shown in FIGS. 1 and 2, a pair of axially spaced sprockets 29 and 30 are fixedly secured to the upper end of the auger and are disposed within cross-beam 28. Hydraulically driven and synchronized motors 31 and 32 are mounted on the cross-beam to have their drive output sprockets 33 and 34, respectively, drivingly connected to the respective auger sprockets by endless chains 35 and 36.

In operation, the scraper bowl of FIG. 1 may be lowered with apron 17 opened to engage cutting edge 16 with the ground during forward movement of the tractor scraper to load material into the bowl. During such loading, the ejector is maintained in its retracted, phantom line position at the rearward end of the scraper bowl. The auger is simultaneously rotated by motors 31 and 32 to raise and distribute material throughout the bowl.

The mounting of the upper end of the auger at the apex of sidewall extensions 37 and 38 of the bowl results in an elevation of the material to the highest point centrally of the bowl. In cooperation with the triangular sidewall extensions, the load capacity of the bowl is utilized to its maximum since the loaded material will naturally flow from such high point outwardly at its natural angle of repose towards the front, rear and sides of the bowl.

After the bowl is filled, rotation of the auger is stopped and the apron is closed. The bowl is then raised to its FIG. 1 transport position to elevate the cutting edge away from the ground. The vehicle is then driven to a dump site whereat the apron is opened and the ejector is moved forwardly to its FIG. 1 solid line position to discharge the load. It is preferable to have the auger running as the ejector is moved forwardly to assist in dislodging the load and to relieve the forces on the auger as the load is moved toward the cutting edge by the ejector. In certain conventional auger-scraper constructions the auger must be moved out of the way of the ejector to permit the ejector to complete its unloading function.

In accordance with this invention, extreme forward movement of the ejector will substantially dispose the auger within recess 23, generally conforming to the shape thereof. In this manner, the ejector may be moved to a forward position closely adjacent to cutting edge 16 to thereby substantially completely empty the bowl upon each unloading operation. After the load is dumped, the ejector is retracted to initiate another cycle of scraper operation.

We claim:

1. A self-loading auger scraper comprising
a bowl having a pair of laterally spaced and vertically disposed sidewalls, a generally horizontally disposed floor connected between said sidewalls and a cutting edge extending transversely between said sidewalls and secured to a forward end of said floor,
a generally upright ejector, extending between said sidewalls, normally positioned at a rearward end of said bowl,
actuating means for selectively moving said ejector from the rearward end towards an open, forward end of said bowl, adjacent to said cutting edge,
a generally upright auger rotatably mounted in said bowl, and disposed rearwardly of said cutting edge,
means for rotating said auger, and
means forming a recess in said ejector, generally conforming to the shape of said auger, for permitting said ejector to move adjacent to said cutting edge upon actuation of said ejector towards the forward end of said bowl.

2. The auger scraper of claim 1 further comprising an apron pivotally mounted on said bowl to normally close the open, forward end thereof.

3. The auger scraper of claim 1 wherein the upper end of said auger is rotatably mounted in a bearing assembly attached to a cross-beam extending and secured between said sidewalls.

4. The auger scraper of claim 1 wherein the lower end of said auger is rotatably mounted in a bearing assembly secured to said floor.

5. The auger scraper of claim 1 wherein each of said sidewalls has a triangularly shaped extension secured thereon with apexes of said extensions being generally aligned laterally with the upper end of said auger.

6. The auger scraper of claim 1 wherein said recess is generally cylindrically shaped.

* * * * *